(12) United States Patent
Liu (10) Patent No.: US 8,928,813 B2
(45) Date of Patent: Jan. 6, 2015

(54) METHODS AND APPARATUS FOR REDUCING STRUCTURED NOISE IN VIDEO

(75) Inventor: Ce Liu, Belmont, MA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 12/914,454

(22) Filed: Oct. 28, 2010

(65) Prior Publication Data

US 2012/0105728 A1    May 3, 2012

(51) Int. Cl.
  *H04N 5/00*     (2011.01)
  *H04N 5/213*    (2006.01)
(52) U.S. Cl.
  CPC ..................................... *H04N 5/213* (2013.01)
  USPC ............................. 348/609; 348/701; 348/620
(58) Field of Classification Search
  USPC ................. 348/607, 618–620, 622, 701, 615, 348/699–700, 407, 625; 382/265, 260–261, 382/236, 107, 275, 280
  IPC ........................................................ H04N 5/00
  See application file for complete search history.

(56) References Cited

U.S. PATENT DOCUMENTS

| 5,576,767 | A | 11/1996 | Lee et al. |
| 6,369,859 | B1 * | 4/2002 | Watkins ........................ 348/616 |
| 6,535,254 | B1 * | 3/2003 | Olsson et al. ................. 348/607 |
| 6,819,804 | B2 | 11/2004 | Tenze |
| 6,888,564 | B2 | 5/2005 | Caviedes |
| 6,959,117 | B2 | 10/2005 | Ratner et al. |
| 7,295,616 | B2 | 11/2007 | Sun |
| 7,535,517 | B2 * | 5/2009 | Zhou et al. ..................... 348/701 |
| 7,587,099 | B2 | 9/2009 | Szeliski et al. |
| 7,769,089 | B1 | 8/2010 | Chou |
| 2007/0036467 | A1 | 2/2007 | Coleman et al. |
| 2009/0110285 | A1 | 4/2009 | Elad |
| 2010/0034296 | A1 | 2/2010 | Cunha |
| 2012/0321184 | A1 * | 12/2012 | Ouzilevski et al. ........... 382/167 |

FOREIGN PATENT DOCUMENTS

| JP | 2003-274181 | 9/2003 |
| KR | 1020050009372 A | 1/2005 |

OTHER PUBLICATIONS

Fast Image and Video Denoising via Non-local Means of Similar Neighborhoods—Published Date: Jun. 2005 http://ftp.ima.umn.edu/preprints/jun2005/2052.pdf.
Nonlocal image and movie denoising—Published Date: 2008 http://hal.archives-ouvertes.fr/docs/00/27/11/47/PDF/ijcvrevised.pdf.

(Continued)

*Primary Examiner* — Trang U Tran
(74) *Attorney, Agent, or Firm* — Steve Wight; Judy Yee; Micky Minhas (57) ABSTRACT

A method of operating a computer system to reduce structured noise in a video is described. Patches in a frame of a sequence of video frames are selected using a modified non-local means (NLM) search algorithm with a reduced search complexity compared to conventional NLM search algorithms. The set of spatial neighboring patches in a frame is extended to include patches in adjacent frames of the video sequence. Patches in the adjacent frames are selected based, at least in part, on a projection of a location of a pixel in the frame into the adjacent frames using a motion estimation algorithm. An average value determined from the combined set of patches is used to replace the pixel currently being processed.

20 Claims, 8 Drawing Sheets

(56) References Cited

OTHER PUBLICATIONS

A rotationally invariant block matching strategy improving image denoising with non-local means—Published Date: 2008 http://ticsp.cs.tut.fi/images/f/f4/Cr1013-lausanne.pdf.
Robust Non-Local Denoising of Colored Depth Data—Published Date: 2008 http://mplab.ucsd.edu/wp-content/uploads/CVPR2008/WorkShops/data/papers/209.pdf.
A High-Quality Video Denoising Algorithm based on Reliable Motion Estimation—Retrieved Date: Aug. 17, 2010 http://people.csail.mit.edu/celiu/pdfs/videoDenoising.pdf.
Awate, S.P. et al.; "Higher-Order Image Statistics for Unsupervised, Information-Theoretic, Adaptive, Image Filtering"; CVPR; 2005; 8 pages.
Baker, S. et al.; "A Layered Approach to Stereo Reconstruction"; Conference on Computer Vision and Pattern Recognition; Santa Barbara, CA; Jun. 1998; pp. 434-441.
Bertalmio, M. et al.; "Image Inpainting"; SIGGRAPH; 2000; pp. 417-424.
Black, M. et al.; "Robust Anisotropic Diffusion"; IEEE Transactions on Image Processing; vol. 7, No. 3; Mar. 1998; pp. 421-432.
Blake, A. et al.; "Interactive Image Segmentation using an adaptive GMMRF model"; ECCV; vol. I; 2004; pp. 428-441.
Blinn J.F.; "Jim Blinn's Corner: Compositing, Part 1: Theory"; IEEE Computer Graphics and Applications; No. 14; Sep. 1994; pp. 83-87.
Buades, A. et al.; "A non-local algorithm for image denoising"; CVPR; 2005; 6 pages.
Comaniciu, D. et al.; "Mean Shift: A Robust Approach Toward Feature Space Analysis"; IEEE Transactions on Pattern Analysis and Machine Intelligence; vol. 24, No. 5; May 2002; pp. 603-619.
Durand, F. et al.; Fast Bilateral Filtering for the Display of High-Dynamic-Range Images; SIGGRAPH; 2002; pp. 257-266.
Field, D.; "Relations between the statistics of natural images and the response properties of cortical cells"; J. Opt. Soc. Am. A; vol. 4, No. 12; Dec. 1987; pp. 2379-2394.
Gabor, D.; "Theory of Communication"; J. of the IEEE 93; 1946; pp. 429-459.
Geman, S. et al.; "Stochastic Relaxation, Gibbs Distributions, and the Bayesian Restoration of Images"; IEEE Transactions on Pattern Analysis and Machine Intelligence; vol. 6; 1984; pp. 721-741.
Leclerc, Y.G.; "Constructing Simple Stable Descriptions for Image Partitioning"; IJCV; vol. 3; Apr. 10, 1994; pp. 73-102.
Lee, A.B. et al.; "Occlusion Models for Natural Images: A Statistical Study of a Scale-Invariant Dead Leaves Model"; International Journal of Computer Vision; vol. 41, No. 1/2; 2001; pp. 35-59.
Mallat, S.G.; "A Theory for Multiresolution Signal Decomposition: The Wavelet Representation"; IEEE Transactions on Pattern Analysis and Machine Intelligence; vol. 11, No. 7; Jul. 1989; pp. 674-693.
Marroquin, J. et al.; "Probabilistic Solution of Ill-Posed Problems in Computational Vision"; Journal of the American Statistical Assoc. 82; Mar. 1987; pp. 76-89.
Martin, D. et al.; "A Database of Human Segmented Natural Images and its Application to Evaluating Segmentation Algorithms and Measuring Ecological Statistics"; ICCV; 2001; pp. 416-423.
Perona, P., et al.; "Scale-Space and Edge Detection Using Anisotropic Diffusion"; IEEE Transactions on Pattern Analysis and Machine Intelligence; vol. 12, No. 7; Jul. 1990; pp. 629-639.
Petschnigg, G., et al.: Digital Photography with Flash and No-Flash Image Pairs; ACM Transactions on Graphics 23; 2004; pp. 664-672.
Portilla, J. et al.; "Image Denoising Using Scale Mixtures of Gaussians in the Wavelet Domain"; IEEE Transactions on Image Processing; vol. 12, No. 11; Nov. 2003; pp. 1338-1351.
Roth, S. et al.; "Fields of Experts: A Framework for Learning Image Priors"; CVPR; 2005; 8 pages.
Schultz, R. et al.; "A Window-Based Bayesian Estimator for Noise Removal"; Proceedings of the 37$^{th}$ Midwest Symposium on Circuits and Systems; vol. 2; Aug. 3-5, 1994; pp. 860-863.
Simoncelli, E.P. et al.; "Noise Removal Via Bayesian Wavelet Coring"; Proceedings of the 3$^{rd}$ IEEE International Conference on Image Processing; vol. I; Sep. 16-19, 1996; Lausanne, Switzerland; pp. 379-382.
Simoncelli, E.P.; "Statistical Models for Images: Compression, Restoration and Synthesis"; 31$^{st}$ Asilomar Conf. on Signals, Systems and Computers; Pacific Grove, CA; Nov. 2-5, 1997; pp. 673-678.
Tomasi, C. et al.; "Bilateral Filtering for Gray and Color Images"; Proceedings of the 1998 IEEE International Conference on Computer Vision; Bombay India; 1998; pp. 839-846.
Zhu, S.C., et al.; "Filters, Random Fields and Maximum Entropy (FRAME): Towards a Unified Theory for Texture Modeling"; International Jouranl of Computer Vision; vol. 27, No. 2; 1998; pp. 107-126.
Zhu, S.C., et al.; "Prior Learning and Gibbs Reaction-Diffusion"; IEEE Trans. on PAMI; vol. 19, No. 11; Nov. 1997; pp. 1236-1250.
Zitnick, C.L. et al.; "Consistent Segmentation for Optical Flow Estimation"; ICCV; 2005; 8 pages.
Felzenszwalb et al., "Efficient Graph-Based Image Segmentation", International Journal of Computer Vision, vol. 59 Issue 2, Sep. 2004, pp. 167-181.
"Notice of Allowance Received for Korea Republic of (KR) Patent Application No. 10-2008-7018429", Mailed Date: Oct. 1, 2013, Filed Date: Jan. 25, 2007, 2 Pages. (w/o English Translation).
Olshausen et al., "Emergence of Simple-Cell Receptive Field Properties by Learning a Sparse Code for Natural Images", Letters to Nature, vol. 381, pp. 607-609, 1996.
Mairal et al., "Multiscale Sparse Image Representation with Learned Dictionaries", Proceedings of the IEEE International Conference on Image Processing, 2007.
Ying et al., "Image Super-Resolution as Sparse Representation of Raw Image Patches", Proceedings of the IEEE Conference on Computer Vision and Pattern Recognition, 2008.
Dabov et al., "Image Denoising by Sparse 3D Transform-Domain Collaborative Filtering", IEEE Transactions on Image Processing, vol. 16, 2007.
MPEG, "MPEG-2 Video Encoding (h.262)", http://www.digitalpreservation.gov/formats/fdd/fdd000028.shtml, 2006.
Dabov et al., "Video Denoising by Sparse 3D Transform-Domain Collaborative Filtering" Proceedings of the European Signal Processing Conference, 2007.
Tschumperlé, David, "Fast Anisotropic Smoothing of Multi-Valued Imaging Using Curvature-Preserving PDE's", International Journal of Computer Vision, vol. 68, pp. 65-82, 2006.
Lui et al., "Automatic Estimation and Removal of Noise from a Single Image", IEEE transactions on Pattern Analysis and Machine Intelligence, vol. 30, pp. 299-314, 2008.
Weiss et al., "What Makes a Good Model of Natural Images?", Proceedings of the IEEE Conference on Computer Vision and Pattern Recognition, 2007.
Elad et al., "Image Denoising via Learned Dictionaries and Sparse Representation", Proceedings of the IEEE Conference on Computer Vision and Pattern Recognition, 2006.
Buades et al., "Denoising Image Sequences Does Not Require Motion Estimation", Proceedings of the IEEE International Conference on Advanced Video and Signal Based Surveillance, 2005.
Cho et al., "The Patch Transform and Its Applications to Image Editing", Proceedings of the IEEE Conference on Computer Vision and Pattern Recognition, 2008.
Barnes et al., "A Randomized Correspondence Algorithm for Structural Image Editing", Proceedings of the ACM Conference on Computer Graphics, 2009.
Szelski et al., "A Comparative Study of Energy Minimization Methods for Markov Random Fields with Smoothness Based Priors", IEEE Transactions on Pattern Analysis and Machine Intelligence, vol. 30 Issue 6, pp. 1068-1080, 2008.
Bruhn et al., "Lucas/Kanade meets Horn/Schunk: Combining Local and Global Optical Flow Methods", Proceedings of the International Joint Conference on Artificial Intelligence, pp. 674-679, 1981.
Lucas et al., "An Iterative Image Registration Technique with an Application to Stereo Vision", Proceedings of the International Joint Conference on Artificial Intelligence, pp. 674-679, 1981.
Horn et al., "Determining Optical Flow", Artificial Intelligence, vol. 17, pp. 185-203, 1981.

(56) References Cited

OTHER PUBLICATIONS

Liu et al., "Noise Estimation from a Single Image", Proceedings of the IEEE Conference on Computer Vision and Pattern Recognition, pp. 901-908, 2006.

Lui, Ce, "Beyond Pixels: Exploring New Representations and Applications for Motion Analysis", PhD Thesis, Massachusetts Institute of Technology, 2009.

Baker et al., "A Database and Evaluation Methodology for Optical Flow", Proceedings of the International Conference on Computer Vision, 2007.

Lui et al., "Human-Assisted Motion Annotation" Proceedings of the IEEE Conference on Computer Vision and Pattern Recognition, 2008.

* cited by examiner

METHODS AND APPARATUS FOR REDUCING STRUCTURED NOISE IN VIDEO

BACKGROUND

Low-end imaging devices such as web-cams and cell phones often record images or videos that are noisy. To improve the quality of images output from such devices, conventional image processing techniques often focus on removing additive white Gaussian noise (AWGN) by filtering images using local neighborhood filters. Linear filters such as arithmetic mean filters and Gaussian filters typically remove noise at the expense of blurring edges in an image. Non-linear filters such as median filters and Wiener filters may be used to reduce blurring, although some a priori knowledge about the noise spectra and the original signal in the image may need to be specified. Noise reduction techniques that do not rely on local neighborhood filtering have also been used to reduce AWGN in images. For example, the non-local means (NLM) method removes noise by averaging pixels in an image, weighted by local patch similarities.

Some image processing techniques for reducing AWGN have been extended to video processing. For example, NLM has been extended to video denoising by aggregating patches in a space-temporal volume. Patches in the space-temporal volume are typically identified using block matching techniques that have been designed for use with video compression.

SUMMARY

The inventor has recognized and appreciated that conventional video denoising technologies, which focus on removing AWGN, may be improved by removing structured noise introduced by many low-end camcorders and digital cameras. Unlike synthetic additive noise, the noise in real cameras often has strong spatial correlations. This structured noise can have many different causes, including the demosaicing process in CCD cameras. To this end, some embodiments are directed to identifying and removing structured noise in video.

Conventional NLM approaches do not consider motion estimation or temporal correspondence between frames when searching for patches during video denoising. The inventor has also recognized and appreciated that selecting patches based, at least in part, on motion estimation that determines underlying motion despite high noise during video denoising may result in higher-quality video than is achievable using conventional video denoising techniques. That is, given two noise-free videos that share the same average peak signal-to-noise ratio (PSNR), the video with more visual consistency between frames may be perceived as having less noise.

Accordingly, some embodiments are directed to a method of reducing structured noise in a video sequence. The method comprises defining, with at least one processor, a first local patch for a pixel in a frame of the video sequence; projecting a location of the pixel into at least some adjacent frames using a motion estimation algorithm, wherein each of the projected pixel locations is associated with a corresponding local patch; selecting based, at least in part, on a content similarity with its corresponding local patch, a set of patches in each of the at least some adjacent frames to which the location of the pixel was projected; determining an average value for patches in a combined set including the sets of patches selected in each of the at least some adjacent frames; and replacing the pixel in the first local patch with the average value.

Some other embodiments are directed to a non-transitory computer-readable storage medium encoded with a plurality of instructions that, when executed by a computer, perform a method of reducing structured noise in a video sequence. The method comprises determining a motion path indicating a location of a pixel in at least some adjacent frames in the video sequence using a motion estimation algorithm, wherein each of the pixel locations are associated with a corresponding local patch; selecting based, at least in part, on a content similarity with its corresponding local patch, a set of patches in each of the at least some adjacent frames for which the motion path was determined; and replacing the pixel in one of the adjacent frames with an average value determined based, at least in part, on patches in a combined set including the sets of patches selected in each of the at least some adjacent frames.

Some other embodiments are directed to at least one processor programmed to: select a pixel in a frame of a video sequence; associate a first local patch with the selected pixel; project a location of the selected pixel into at least some adjacent frames of the video sequence using a motion estimation algorithm; associate each of the projected pixel locations with a corresponding local patch; select based, at least in part, on a content similarity with its corresponding local patch, a set of patches in each of the at least some adjacent frames to which the location of the pixel was projected; determine an average value for patches in a combined set including the sets of patches selected in each of the at least some adjacent frames; and replace the pixel in the first local patch with the average value.

The foregoing is a non-limiting summary, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
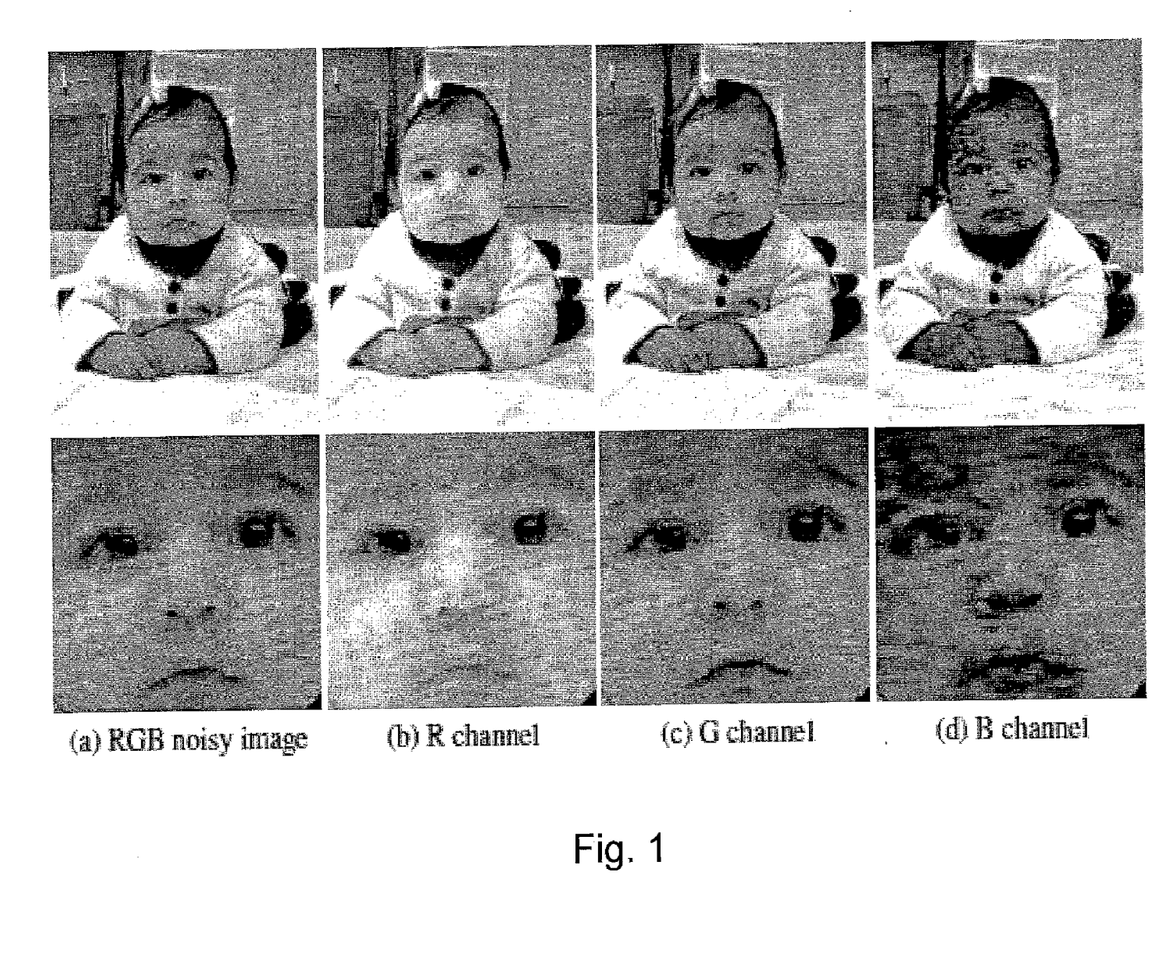
FIGS. 1A-1D are exemplary noisy images illustrating the presence of structured noise.

As described above, conventional video denoising techniques focus on removing additive white Gaussian noise (AWGN). However, removing real, structured noise in digital videos remains a challenging problem. FIG. 1 illustrates an exemplary noisy image that has been separated into red (R), green (G), and blue (B) channels. Evident in FIG. 1 is the presence of structured noise in the blue channel (FIG. 1($d$)). This structured noise may be misinterpreted as signal and may not be removed by conventional denoising algorithms that employ block matching techniques to identify patches in a set of adjacent video frames. In contrast, some embodiments described herein reduce structured noise in videos by using motion estimates for a pixel that project the location of the pixel to neighboring frames in the sequence, wherein patches in the neighboring frames are selected based on the projected pixel locations.

Figure 2:
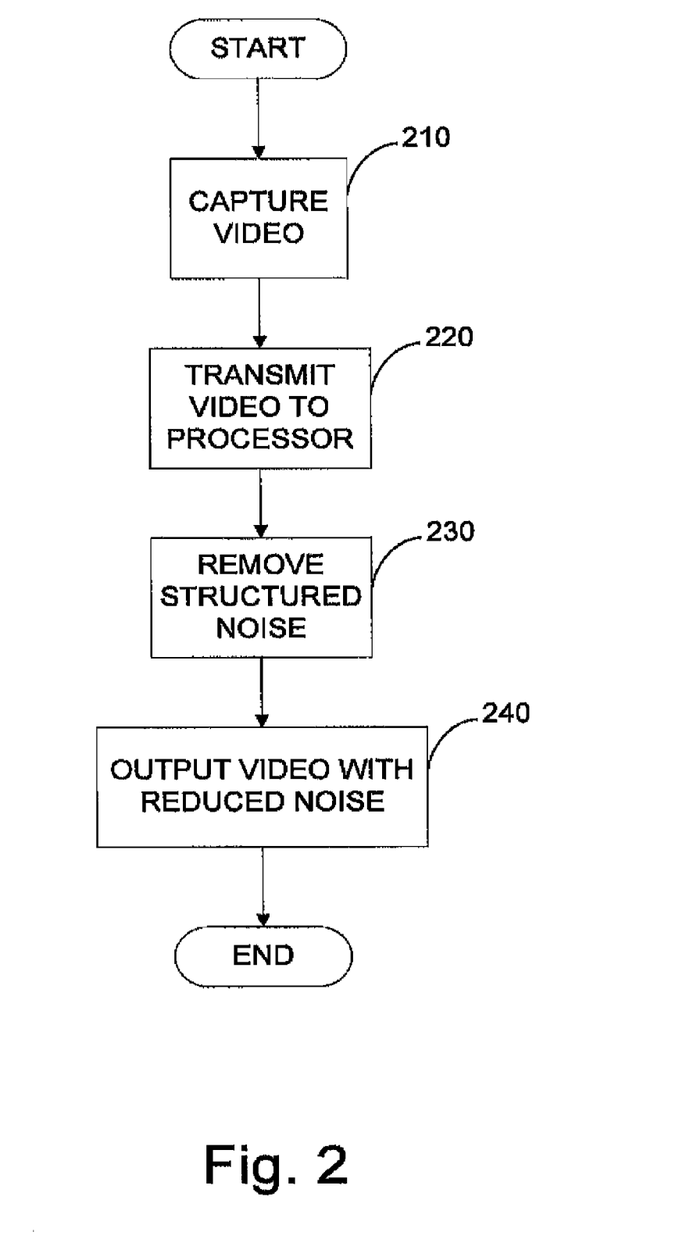
FIG. 2 is a flow chart of a process for providing a video with reduced structured noise in accordance with some embodiments of the invention.

An exemplary process for removing structured noise in accordance with some embodiments of the invention is illustrated in FIG. 2. In act 210, video is captured using any suitable video recording device. For example, video may be captured on a cell phone, a camcorder, a webcam, or any other video recording device. After capturing the video in act 210, the process proceeds to act 220, where the video is transmitted to at least one processor for video denoising in accordance with the video denoising processes described herein. In some embodiments, the processor may be included as a portion of the video recording device that captured the video, although in other embodiments, the processor configured to perform video denoising on the captured video may be located remote to the video recording device, as embodiments of the invention are not limited in this respect. Prior to transmitting the video to a processor, the video may be stored in one or more storage devices to enable the video to be processed at a later time. In some embodiments, the captured video may be processed in real-time to reduce structured noise in the video, as embodiments of the invention are not limited based on whether the structured noise is removed during recording of the video, or as a post-processing video enhancement process.

After the video is transmitted to a processor in act 220, the process proceeds to act 230, where at least some structured noise is removed from the video signal using video denoising methods described in more detail below. After performing denoising on the video sequence in act 230, the process proceeds to act 240, where the video with reduced noise is output. The processed video may be output in any suitable way including, but not limited to, displaying the video on a display device and transmitting the video to another device for storage or display.

The inventor has recognized and appreciated that estimating underlying motion of pixels in a sequence of video frames may facilitate the removal of structured noise from videos. However, estimating motion and noise in video frames suffers from a chicken-and-egg problem, since motion typically is estimated from the underlying signals after denoising, and denoising often relies on the spatial correspondence of objects in a sequence of images determined using motion estimation. In some embodiments of the invention, the position of a pixel representing a portion of an imaged object in a sequence of frames of a video signal is tracked to facilitate the selection of structurally similar patches in the sequence of frames despite the presence of noise in the image sequence. In some embodiments, a modified non-local means (NLM) search algorithm is used to identify similar patches for each frame in a sequence of frames.

Due to the inherent search complexity of conventional NLM algorithms, searching for similar patches is often constrained to a small neighborhood surrounding a pixel in an image. In some embodiments, an approximate K-nearest neighbor patch matching process is used to enable searching over an entire image for similar patches with lower search complexity than conventional NLM algorithms. Additionally, in some embodiments, the noise level at each frame in the video signal is estimated to provide noise-adaptive denoising.

For a local patch defined for a pixel in a frame of a video, a set of supporting patches in the frame and at least some temporally adjacent frames may be determined. To ensure the nature of spatial and temporal sparsity of videos, supporting patches that share similar structures with the local patch may be selected. In some embodiments, this is ensured by projecting a pixel location (and corresponding local patch) into adjacent frames of a video sequence and defining approximate K-nearest neighbor patches for the local patch and the projected patch in each of the frames to which the pixel is projected.

Figure 3:
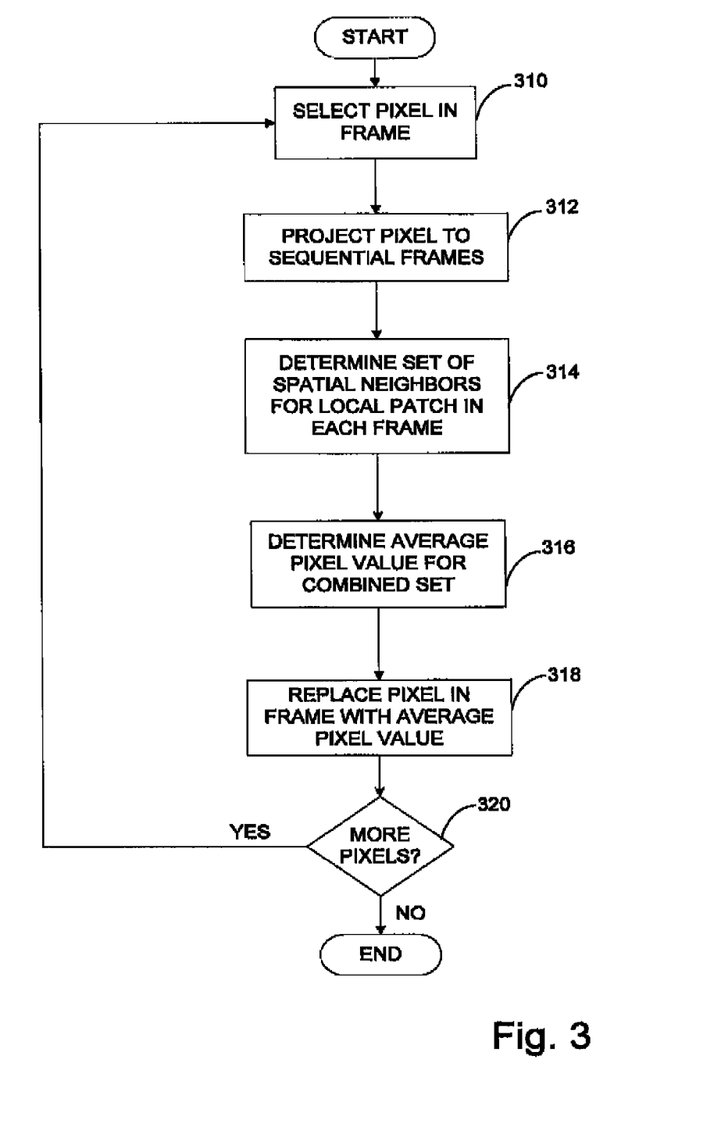
FIG. 3 is a flow chart of a process for removing structured noise from a video signal in accordance with some embodiments of the invention.

An exemplary process for reducing structured noise in a video signal including a plurality of sequential video frames in accordance with some embodiments of the invention is illustrated in FIG. 3. In act 310 a pixel is selected in a frame of a video frame sequence. It should be appreciated that the pixel may be selected in any frame of the video frame sequence including the first frame, the last frame, or a middle frame of the video sequence, as embodiments of the invention are not limited in this respect. A local patch may be defined for the selected pixel and the local patch may be any suitable size, as embodiments of the invention are not limited in this respect. For example, a typical patch size may be 7×7 pixels. After a pixel has been selected, the process proceeds to act 312, where the location of the pixel is projected to at least some adjacent frames of the sequence of frames using a motion estimation algorithm. A preferable motion estimation algorithm used with embodiments of the invention determines underlying motion despite a high level of noise in the adjacent frames. After the location of the selected pixel has been determined for at least some adjacent frames in the video sequence, a local patch may be defined for each of the projected pixels in the adjacent frames.

The process then proceeds to act 314, where a set of spatial neighbor patches is determined for the local patches defined in each of the adjacent frames to which the pixel was projected. In an NLM search algorithm, a set of patches that represent visually similar areas in an image are identified and a weighted average of the set of similar patches is used to update the value of a selected pixel. The similarity of patches in the set of spatial neighbors may be determined using any suitable measure of similarity including, but not limited to, comparing the values of the pixels in patches to determine a difference in content between the patches. In some embodiments that employ a modified NLM search process described in more detail below, the set of spatial neighbor patches for a local patch in a frame is determined in act 314 using an approximate K-nearest neighbor (AKNN) search that has a reduced search complexity compared to conventional NLM algorithms.

After determining a set of spatial neighbor patches for local patches in each of the adjacent frames in act 314, the process proceeds to act 316, where a combined set of patches including the spatial neighbor patches identified in frames of the video sequence are averaged to determine an average value for the combined set. In some embodiments, the average value may be based on a weighted average of the patches in the combined set, although the particular manner in which the patches are weighted is not a limiting aspect of embodiments of the invention. For example, in some embodiments, a weight associated with a patch may be decreased as a spatial and/or temporal distance of the patch from the local patch in the frame increases. That is, patches located farther away from the local patch in the image may be weighted less than patches located closer to the local patch for the selected pixel and/or patches in more temporally distant frames from the frame that includes the currently selected pixel may be weighted less than patches in frames closer in time to the current frame. It should be appreciated, however, that any other suitable metric for weighting the patches in the combined set additionally or alternatively be used, as embodiments of the invention are not limited in this respect.

After determining an average value for the combined set of patches in act 316, the process proceeds to act 318, where the value of the pixel selected in act 310 is replaced by the average value determined in act 316. After replacing the pixel value in act 318, the process proceeds to act 320, where it is determined whether there are additional pixels to process. If it is determined in act 320 that there are additional pixels to process, the process returns to act 310, where a new pixel is selected and processed. However, if it is determined in act 320 that there are no more pixels to process, the video denoising process ends. Exemplary processes for selecting a plurality of patches in a frame (e.g., act 314) are described in more detail below.

As used herein, the notation $\{I_1, I_2, \ldots, I_T\}$ denotes an input noisy sequence that contains T frames of video. The notation $z=(x; y; t)$ is used to index the space-time volume of frames, and $P(z)$ (or equivalently $P(x; y; t)$) is used to denote a patch at location z. An exemplary process for selecting a set of spatial neighboring patches for a patch $P(x, y)$ in a frame is described below in connection with FIG. 4. For notational convenience in describing the process for selecting a set of similar patches in a frame, let $q=(x; y)$ thereby omitting time t from the notation. For each pixel q, a set of approximate K-nearest neighbors (AKNN) $N(q)=\{P(q_i)\}_{i=1}^K$ is obtained by sampling the frame for a set of patches $N(q)$ that include visually similar elements to the patch defined for pixel q. Let $v_i=q_i-q$ be the distance of the found patch from the patch defined for pixel q. Thus, searching for $N(q)$ is equivalent to searching for $\{v_i\}$.

In some embodiments, a priority queue data structure may be used to store the set of K-nearest neighbors such that the following increasing order is maintained for the elements in the priority queue:

$$D(P(q),P(q_i)) \leq D(P(q),P(q_j)), \forall 1 \leq i < j \leq K,$$

where $D(\cdot,\cdot)$ is sum of square distance (SSD) over two patches, defined as $$D(P(q), P(q_i)) = \sum_{u \in [-s,s] \times [-s,s]} (I(q+u) - I(q_i+u)^2).$$

When a new patch $P(q_i)$ is pushed to the priority queue, it may be discarded if $D(P(q),P(q_i))$ is greater than the last element of the queue (i.e., the element with the largest SSD relative to the patch $P(q)$), otherwise the patch $P(q_i)$ may be added to the priority queue at the appropriate position based on its calculated SSD.

A max heap implementation of the priority queue may have a complexity of $O(\log K)$. Given an image with N pixels, the complexity of a brute-force K-nearest neighbor search over the entire image is $O(N^2 \log K)$, which may be prohibitive for many high-definition (HD) videos. In some embodiments, this search complexity is reduced by using an approximate K-nearest neighbor (AKNN) algorithm that includes three phases, initialization, propagation, and random search, each of which is discussed in more detail below.

Figure 4:
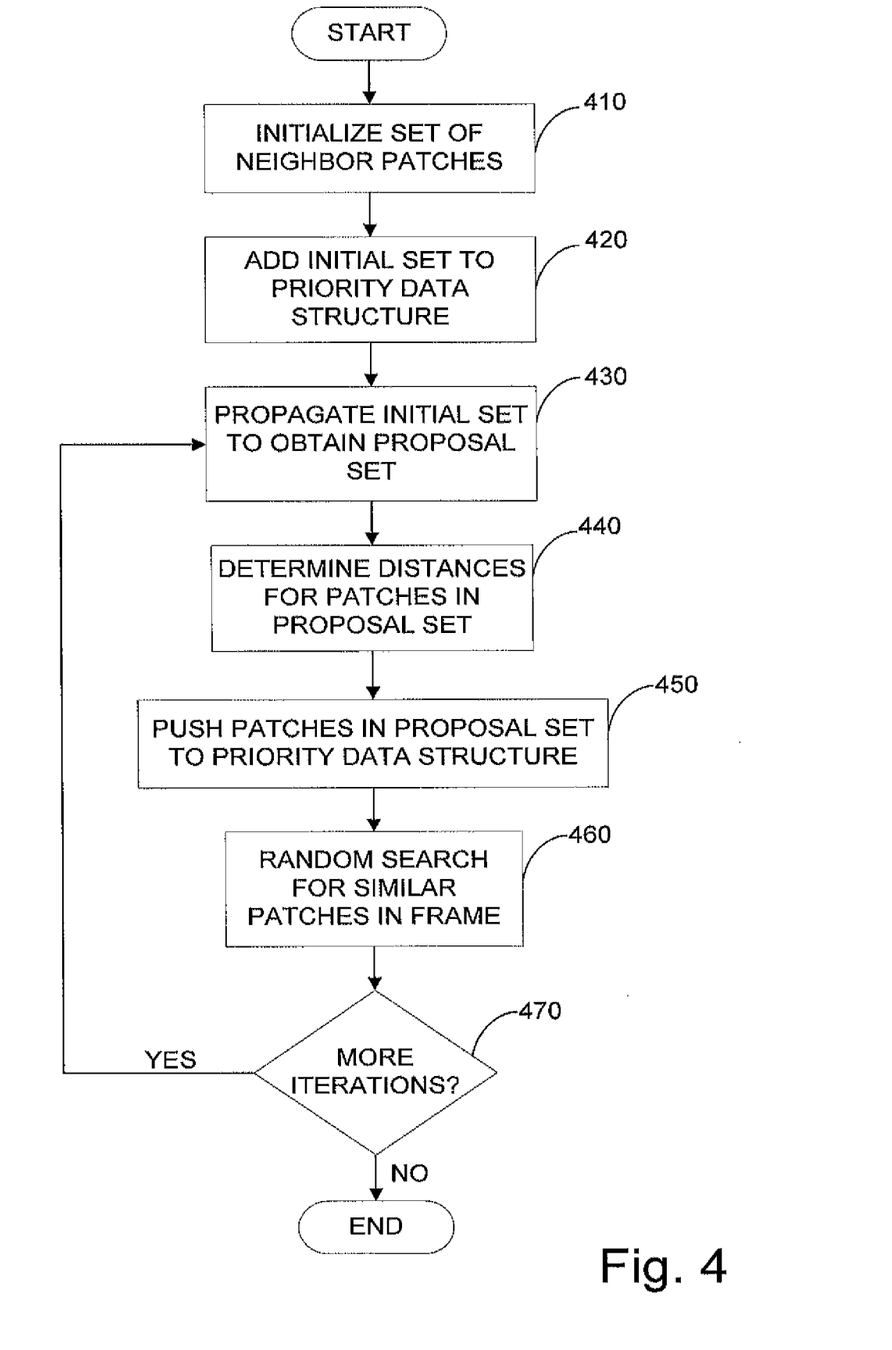
FIG. 4 is a flow chart of a process for determining a set of similar patches in a frame in accordance with some embodiments of the invention.

In some embodiments, any new patch $P(q)$ generated during using the AKNN algorithm may be pushed to the priority queue to maintain the order in the queue. An exemplary process of identifying similar patches in a frame in accordance with some embodiments of the invention is shown in FIG. 4. In act 410, an initial set of patches in a frame are identified by a random search of the image in accordance with the following relation:

$$v_i = \sigma_s n_i,$$

where $n_i$ is a standard 2d normal random variable, and $\sigma_s$ controls the radius of the search. In one implementation, $\sigma_s = w/3$, where w is the width of an image, however it should be appreciated that any suitable value of $\sigma_s$ may be used. After selection of the initial set of patches in act 410, the process proceeds to act 420, where the initial set is stored in a priority data structure, as discussed above. The priority data structure may be any suitable data structure that is configured to order patches based on their content similarity (e.g., SSD) with a patch $P(q)$ defined for a currently processed pixel q, as embodiments of the invention are not limited in this respect.

After the initial set of patches has been stored in act 420, an iterative process may be used to refine the set of patches stored in the priority data structure. In some embodiments, the iterative process includes acts of propagation and random search performed in an interleaving manner. In one implementation, propagation of a patch is alternated between scanline order and reverse scanline order. In the scanline order, the set of patches with offsets $\{v_i(x,y)\}$ is propagated to neighbors $\{v_i(x-1,y)\}$ and $\{v_i(x,y-1)\}$. In the reverse scanline order, the set of patches with offsets $\{v_i(x,y)\}$ is propagated to neighbors $\{v_i(x+1,y)\}$ and $\{v_i(x,y+1)\}$.

Figure 5:
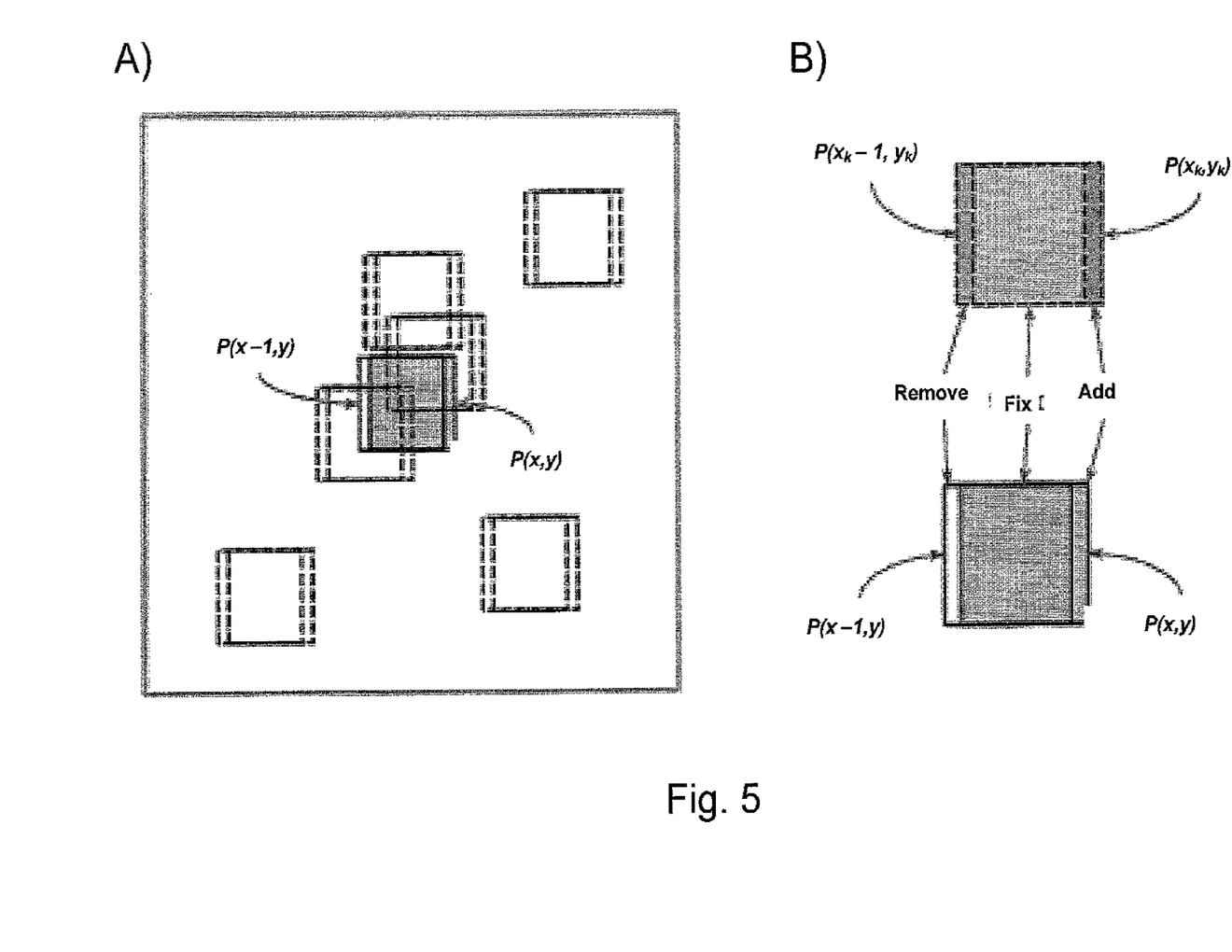
FIGS. 5A and 5B are diagrams associated with a process for determining a proposed set of neighboring patches in accordance with some embodiments of the invention.

In act 430, an initial set of patches may be propagated in either the scanline order or the reverse scanline order, as described above. An example of propagation in accordance with some embodiments is schematically illustrated in FIG. 5. In the illustrated example, the AKNN of patch $P(x-1, y)$ are used to improve the AKNN of patch $P(x, y)$. The set of approximate K-nearest neighbors of $P(x-1, y)$ (e.g., the set including element 510) are shifted one pixel to the right to obtain a proposed set of patches (e.g., the set including element 512) and each of the patches in the proposed set are pushed to the priority queue of $P(x, y)$.

After the proposed set has been determined in act 430, the process proceeds to act 440, where the content similarity (e.g., SSD) between each of the patches in the proposed set and the patch $P(q)$ are calculated. Because the patches in the proposed set are neighbors of the patches in the initial set, recalculating each of the patch similarities may not necessary, thereby speeding up the calculations. Rather, as shown in FIG. 5B, the content similarity in the overlapping region remains the same and the total patch similarity can be determined by evaluating the contribution of the pixels in the nonoverlapping regions. For example, as shown in FIG. 5B, for each patch in the proposed set $P(x-1, y)$, SSD calculations for the leftmost column of pixels are removed from the total distance and SSD calculations for the rightmost column of pixels are added to the total content similarity measure, whereas the SSD calculations for the overlapping columns of pixels remain the same. After determining content similarities to the patch $P(q)$ for the patches in the proposed set in act 440, the process proceeds to act 450, where the patches are pushed to the priority queue and patches with a content similarity measure smaller than patches already in the queue are added to the priority queue data structure.

After propagation and updating the priority queue has been completed in act 450, the process proceeds to act 460, where each patch in the priority queue may be randomly matched with other patches in the image for M times in accordance with the following formula:

$$v_i = \sigma_s \alpha^i n_i, i=1,\ldots,M,$$

where $n_i$ is a standard 2d normal random variable, $\alpha=\frac{1}{2}$ and $M=\min(\log_2 \alpha_s, K)$. Thus, the radius of the random search $\sigma_s \alpha^i$ decreases exponentially. Each random guess that is identified in act 460 is pushed to the priority queue to maintain the increasing order of the queue.

After the random search has been completed in act 460, it is determined in act 470 whether more iterations of the propagation/random search loop are to be performed. In some embodiments, the number of iterations may be a fixed number. However, in other embodiments, the number of iterations may depend, at least in part, on a metric that is determined during the iterative process. For example, after each iteration, a metric that measures a change in a similarity measure between a previous set of patches and the current set of patches may be determined and the process may be terminated if this change is below a predetermined threshold value. If it is determined in act 470 that more iterations are to be performed, the process returns to act 430, where the set of patches stored in the priority queue data structure are propagated, as described above. However, if it is determined in act 470 that no more iterations are to be performed, the matching process ends, and the patch P(x, y) is added into the set N(x, y) for the frame.

As discussed above, using a motion estimation algorithm to track the location of a pixel across adjacent frames of a video signal during video denoising may be an important factor for producing video that is visually pleasing. In some embodiments, an optical flow algorithm may be used to project a pixel (and corresponding local patch) location to neighboring frames to facilitate the selection of spatial neighbor patches in each frame to which the pixel location is projected. An exemplary optical flow algorithm that may be used in accordance with some embodiments of the invention integrates the Lucas-Kanade method into the total variation optical flow framework with robust L1 norms for both the data and smoothness terms. Since, in general, optical flow is not invertible, the forward flow $w^f(z)=[v_x, v_y, 1]$ from frame $I_t$ to $I_{t+1}$, and backward flow $w^b(z)=[v_x, v_y, -1]$ from frame $I_t$ to $I_{t-1}$, may be modeled in order to establish bidirectional correspondence.

Figure 6:
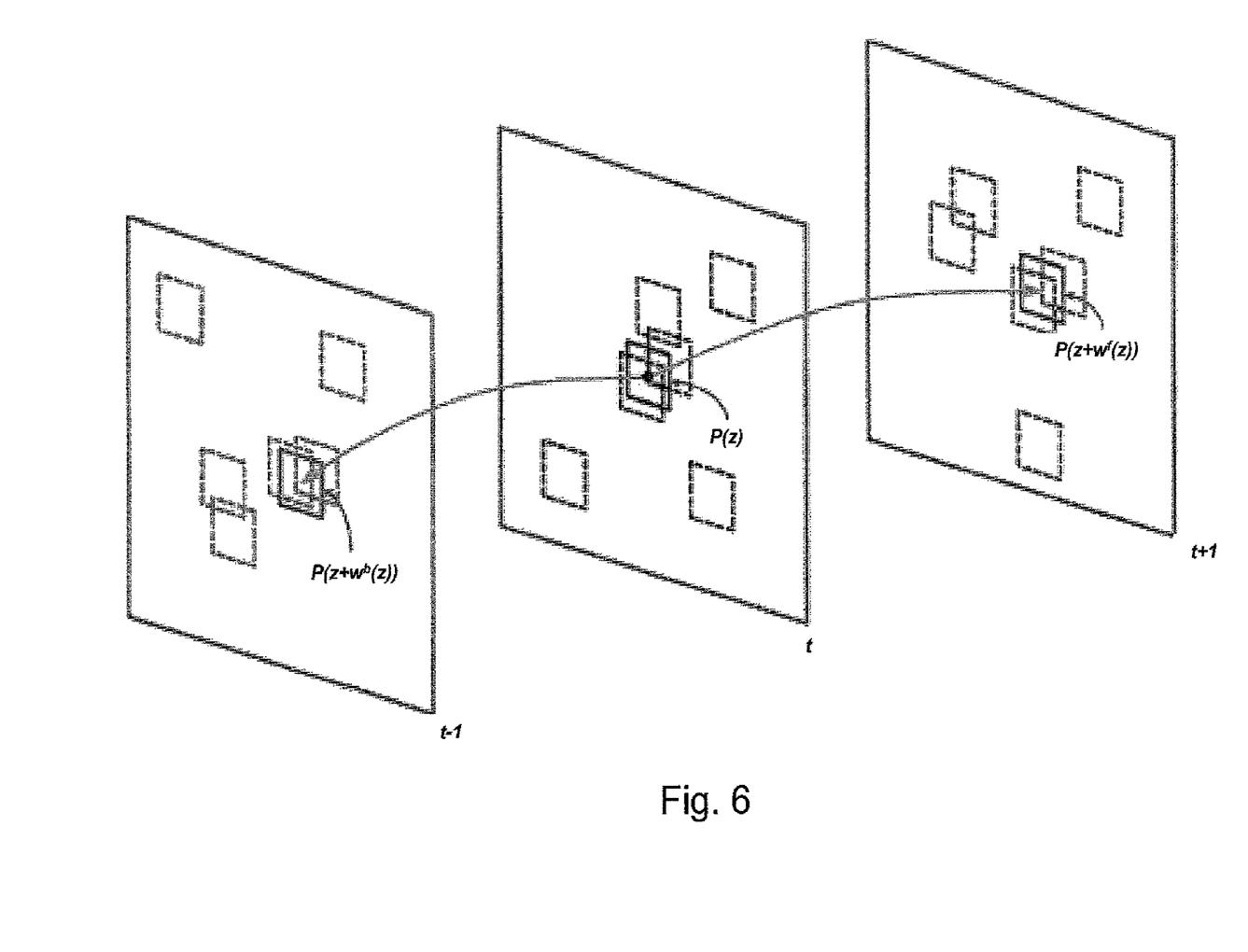
FIG. 6 is an illustration of a process for projecting a pixel location to adjacent frames of a video signal that may be used with some embodiments of the invention.

As shown in FIG. 6, using this notation, pixel z corresponds to $z+w^f(z)$ in the next frame and to $z+w^b(z)$ in the previous frame. Thus, patches defined for a current frame can propagate up to ±H frames. In one exemplary embodiment, H=5 frames. The AKNN patches determined with respect to the projected local patch in at least some of the adjacent frames of a video signal may be added to the set of supporting patches identified in the frame that includes the currently processed pixel, and therefore the motion path results in a series of AKNNs $\{N_{t-H}, \ldots, N_{t-1}, N_t N_{t+1}, \ldots, N_{t+H}\}$, which forms the supporting patches for the patch P(z) defined for pixel z, where $N_i = \{P(z_{ij})\}_{j=1}^K$ denotes the patches in the AKNN at the ith frame. The notation $z_{ij}=(x_{ij},y_{ij},i)$ indicates the jth-nearest neighbor of the corresponding pixel at frame i. The non-local means estimate for pixel z can be written as:

$$\hat{I}(z) = \frac{1}{z} \sum_{i=t-H}^{t+H} \gamma^{|i-t|} \sum_{j=1}^{K} I(z_{ij}) \exp\left\{-\frac{D_w(P(z), P(z_{ij}))}{2\sigma_t^2}\right\},$$

where Z is the normalization factor:

$$Z = \sum_{i=t-H}^{t+H} \gamma^{|i-t|} \sum_{j=1}^{K} \exp\left\{-\frac{D_w(P(z), P(z_{ij}))}{2\sigma_t^2}\right\},$$

and $D_w(\bullet,\bullet)$ is a weighted SSD function, summed over spatial, but not temporal, offsets:

$$D_w(P(z_1), P(z_2)) = \frac{1}{Z'} \sum_{u \in [-s,s] \times [-s,s] \times 0} (P(z_1+u) - P(z_2+u))^2 \exp\left\{-\frac{\|u\|^2}{2\sigma_t^2}\right\},$$

where $\sigma_p=s/2$, and Z' is a normalization constant, $\gamma$ can be set to control temporal decay, and $\sigma_t$ is related to the noise level in the video sequence, as discussed in more detail below.

After a combined set of patches $\{N_{t-H}, \ldots, N_{t-1}, N_t, N_{t+1}, \ldots, N_{t+H}\}$ has been determined for the patch P(z) defined for pixel z, the patches in the combined set may be averaged to determine an average value that is used to replace the value of pixel z, as described above.

For a fixed number of iterations, the complexity of an exemplary denoising algorithm described herein for a frame is O(NHK log K), where N is the number of pixels per frame, H is the temporal window size, and K is the number of approximate K-nearest neighbors. Compared to a conventional NLM algorithm, which has a complexity of $O(N^2H)$ the modified NLM process described herein provides a significant reduction in complexity, since K<<N (typically K=10 and N=640×480, although other values of K and N may also be used). Even if the search space of the conventional NLM algorithm is reduced to a 3D volume M×M×(2H+1), (typically M=40), the complexity of the 3D NLM algorithm remains as $O(NHM^2)$, which is still greater than the algorithm(s) described herein, which considers patches over the entire image lattice and 2H+1 frames.

In some embodiments, the parameter $\sigma_t$ may be adjusted based, at least in part, on an estimate of the noise in the video sequence. For example, when the noise level is low in the video sequence, the value of $\sigma_t$ may be set to be small to avoid oversmoothing, whereas when the noise level is high, the value of $\sigma_t$ may be set to be large to smooth out noise. In some embodiments, a single-frame noise estimator may be used. However in other embodiments, a simple noise model based on motion estimation of pixels in a sequence of images may be used to enable adaptive noise removal. Such a noise model for estimating noise in a sequence of image frames is described below.

As frame $I_{t+1}$ is warped back to time t according to the forward flow field $w^f(z)$, the difference between the warped frame and $I_t$ should in theory be the difference of independent noise. However, the inventor has recognized and appreciated that motion estimation can be unreliable especially at textureless regions and the brightness constancy assumption fails for occluded regions. Therefore, in some embodiments, an outlier in noise estimation may be introduced as follows:

$$I_t(z) = I_{t+1}(z+w^f(z)) + \alpha_z n_z + (1-\alpha_z) u_z.$$

In the above equation, $n_z$ is a pixel-wise Gaussian random variable: $E(n_z)=0, E(n_z^2)=\sigma_n$ and $u_z: U[-1,1]$ is a pixel-wise uniform random variable. These two random variables are balanced by weight $\alpha_z$. Let $J_t(z)=I_t(z)-I_{t+1}(z+w^t(z))$. An expectation-maximization (EM) algorithm may be used to estimate the noise parameter $\sigma_n$ as follows:

1. Initialize $\sigma_n=20$. Loop between step 2 and 3 until convergence.

2. (E-step) Evaluate $$\alpha_z = \frac{\exp\left\{-\frac{J_t(z)}{2\sigma_n^2}\right\}}{\exp\left\{-\frac{J_t(z)}{2\sigma_n^2}\right\} + \frac{1}{2}\sqrt{2\pi}\,\sigma_n}.$$

3. (M-step) Estimate $$\sigma_n = \sqrt{\frac{\sum_z J_t(z)^2 \alpha_z}{\sum_z \alpha_z}}.$$

In some embodiments, this estimation may be determined for each of the color channels (e.g., R, G and B) independently to estimate a noise level in each of the channels.

The relationship between the noise level $\sigma_n$ and scaling parameter $\sigma_t$ depends on K and H. It should be appreciated that any values of K and H may be used, as embodiments of the invention are not limited in this respect. In one exemplary implementation, K=11 and H=5 (which means that there are in total K(2H+1)=121 patches in total for NLM at one pixel), and $\sigma_t=\sigma_n$.

The inventor has conducted experiments to examine whether selecting patches based, at least in part, on estimated motion of a pixel across frames of a video sequence for video denoising as described herein facilitates the denoising process compared to conventional video denoising algorithms that do not estimate motion. In an exemplary implementation, 7×7 patches, K=11 nearest neighbors (including the patch itself), and 11 temporal frames (H=5) were used to estimate the effect of a motion estimation algorithm that detects underlying motion despite high noise on video denoising. Four iterations of propagation/random K-nearest neighbor matching was used for each frame. The EM algorithm for noise estimation converged in about ten iterations.

Figure 7:
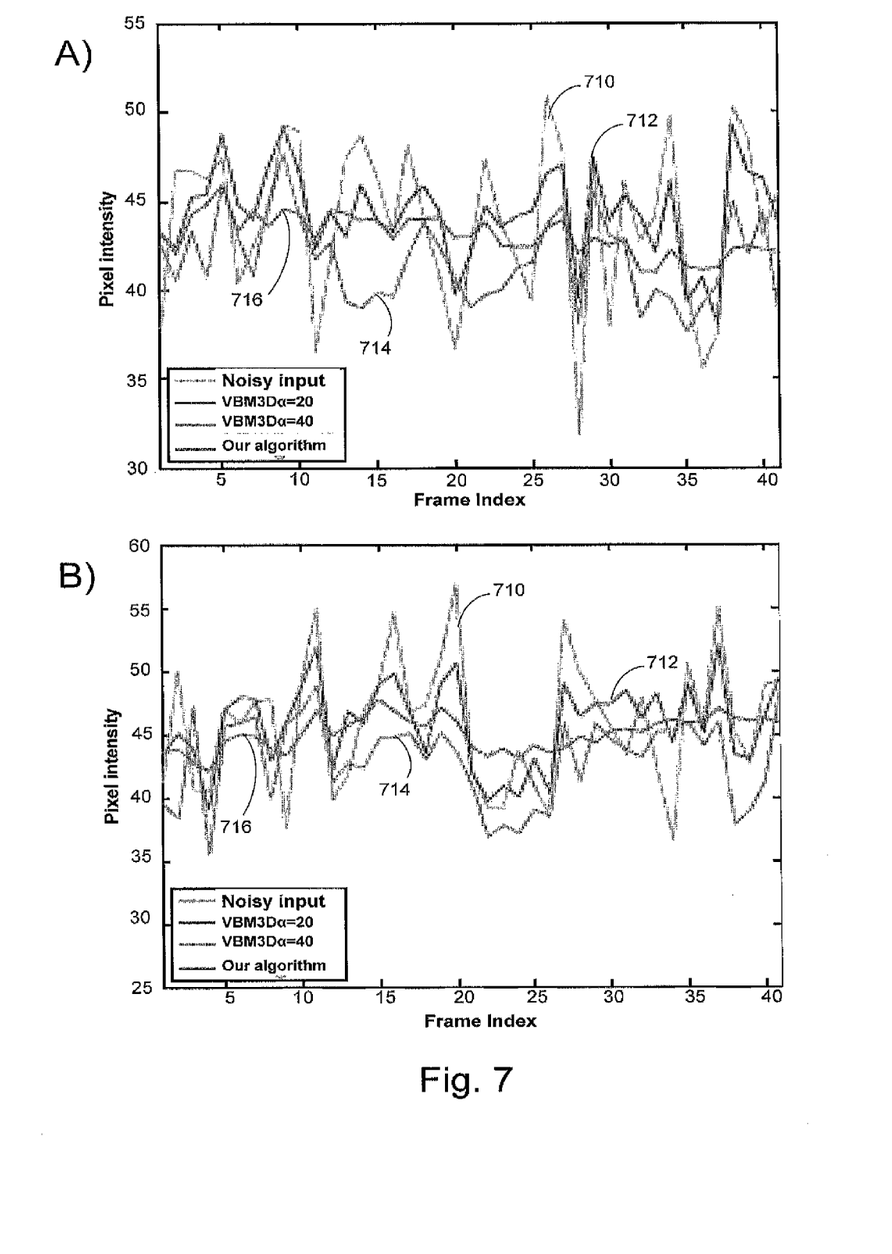
FIGS. 7A and 7B are respective diagrams illustrating a metric for comparing the temporal variation across adjacent frames for two exemplary video sequences in accordance with some embodiments of the invention.

The average peak signal to noise ratio (PSNR) over a video sequence is a conventional metric for measuring video denoising qualities. However, PSNR does not provide a reliable measure of temporal coherence. To evaluate the effect of the denoising algorithm(s) described herein, a human-assisted motion annotation tool may be used to annotate the ground-truth motion of a video sequence. Based on the annotated motion it may be determined how the pixel intensities change over time for different denoising algorithms. Two exemplar motion paths are plotted in FIGS. 7A and 7B. In a first motion path shown in FIG. 7A, it is evident that two conventional denoising algorithms described by traces 712 and 714 have less temporal fluctuation than the uncorrected noisy input 710. However, the denoising algorithm described herein, which uses a motion estimation algorithm that detects underlying motion despite high noise when selecting patches for denoising has overall the least temporal fluctuation of any of the traces shown in FIG. 7A. Similarly in FIG. 7B, although the traces 722 and 724 for conventional denoising techniques have reduced temporal fluctuations when compared to the noisy sequence 720, the trace 726 corresponding to the novel denoising algorithm described herein has the least temporal fluctuation.

Figure 8:
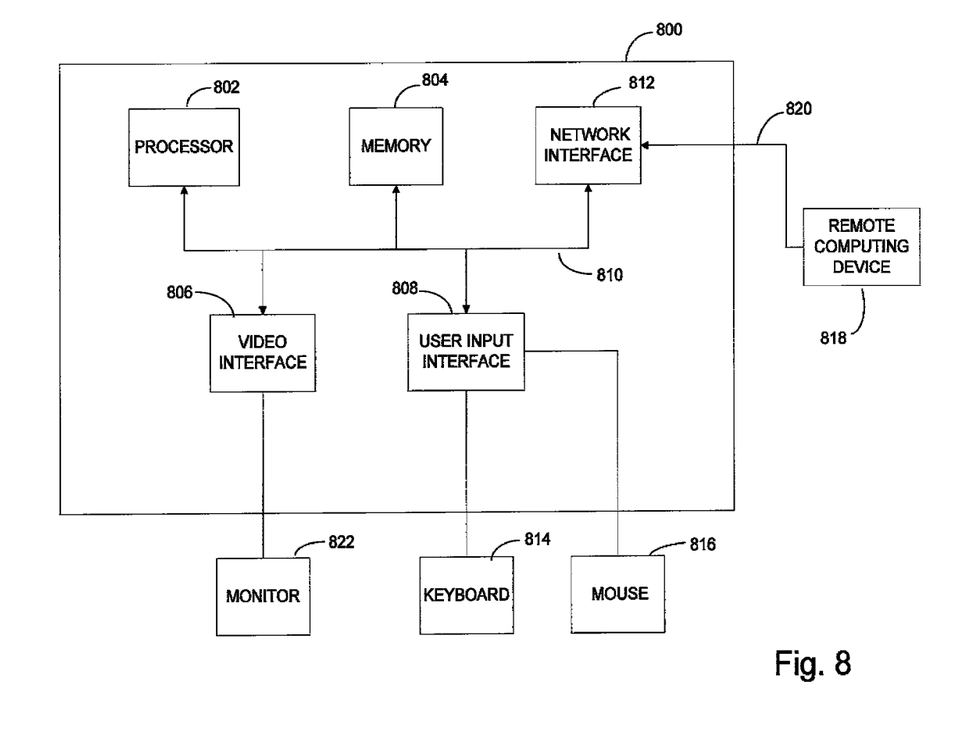
FIG. 8 is a block diagram of a computer system on which some embodiments of the invention may be implemented.

FIG. 8 shows a schematic block diagram of an illustrative computer 800 on which aspects of the invention may be implemented. Only illustrative portions of the computer 800 are identified for purposes of clarity and not to limit aspects of the invention in any way. For example, the computer 800 may include one or more additional volatile or non-volatile memories, one or more additional processors, any other user input devices, and any suitable software or other instructions that may be executed by the computer 800 so as to perform the function described herein.

In the illustrative embodiment, the computer 800 includes a system bus 810, to allow communication between a central processing unit 802, a memory 804, a video interface 806, a user input interface 808, and a network interface 812. The network interface 812 may be connected via network connection 820 to at least one remote computing device 818. Peripherals such as a monitor 822, a keyboard 814, and a mouse 816, in addition to other user input/output devices may also be included in the computer system, as the invention is not limited in this respect.

In some embodiments, one or more techniques for video denoising disclosed herein may be performed by one or more processors included in the same or different computer including, but not limited to computer 800. For example, the method illustrated in FIG. 4 for selecting a set of spatial neighbors in a frame may be executed on a different processor than the method schematically illustrated in FIG. 6 for determining corresponding patches in adjacent frames that are temporally consistent with patches identified in a frame. Additionally, in embodiments where multiple processors are used, the results of one method (e.g., spatial neighbor selection in FIG. 4) performed by a first processor may be transmitted to a second processor to perform a second method (e.g., temporal-spatial neighbor selection in FIG. 6) using any suitable technique including, but not limited to, transmitting the results across a wired or wireless network, storing the results in a shared database, and physically transferring the results to a second computer on a tangible non-transitory computer-readable storage medium.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed by at least one computer processing device of reducing structured noise in a video sequence, the method comprising:

defining a first local patch for a pixel in a frame of the video sequence;

projecting a location of the pixel into at least some adjacent frames of the video sequence using a motion estimation algorithm to obtain projected pixel locations, wherein individual projected pixel locations are associated with corresponding local patches;

selecting sets of patches from the at least some adjacent frames to which the location of the pixel was projected;

determining an average value for a combined set that includes the sets of patches selected from the at least some adjacent frames; and replacing the pixel in the first local patch with the average value, wherein the selecting the sets of patches from the at least some adjacent frames to which the location of the pixel was projected comprises:

sampling an individual adjacent frame to select an initial set of initial patches;

storing the initial set of initial patches in a priority data structure that orders the initial patches in the initial set based on first content similarities of the initial patches with an individual corresponding local patch in the individual adjacent frame; and refining the initial set of initial patches using an iterative process, wherein the iterative process comprises:
defining a proposed set of patches, wherein the proposed set includes neighboring patches of an individual initial patch in the initial set;
determining second content similarities for the neighboring patches in the proposed set with the individual corresponding local patch; and
replacing the individual initial patch in the priority data structure with an individual neighboring patch when a corresponding second content similarity of the individual neighboring patch is greater than a corresponding first content similarity of the individual initial patch.

2. The method of claim 1, wherein determining the average value comprises:
determining the average value as a weighted average based, at least in part, on spatial distances between multiple patches of the combined set and the individual corresponding local patch.

3. The method of claim 2, further comprising:
weighting at least one pixel value for another patch of another frame in the combined set based, at least in part, on a number of frames between the another frame and the frame that includes the first local patch.

4. The method of claim 1, wherein the first content similarities and the second content similarities are determined using a sum of square distances technique.

5. The method of claim 1, further comprising:
estimating at least one noise value for the at least some adjacent frames in the video sequence; and
adjusting a weighted average used for the average value based, at least in part, on the estimated at least one noise value.

6. The method of claim 5, wherein estimating at least one noise value comprises estimating multiple noise levels in each of a plurality of color channels.

7. A computer-readable memory device or storage device encoded with a plurality of instructions that, when executed by a processing device of a computer, cause the processing device of the computer to perform acts comprising:
determining a motion path of a first pixel in a first frame of a video sequence to an adjacent frame in the video sequence using a motion estimation algorithm, wherein the first pixel is associated with a corresponding first local patch in the first frame, the first local patch comprising multiple first local patch pixels;
determining an adjacent local patch in the adjacent frame based on the motion path, the adjacent local patch comprising multiple adjacent local patch pixels;
selecting a set of adjacent supporting patches from the adjacent frame, the set of adjacent supporting patches being selected using the adjacent local patch, wherein the adjacent supporting patches include at least a first adjacent supporting patch having multiple first adjacent supporting patch pixels in the adjacent frame and a second adjacent supporting patch having multiple second adjacent supporting patch pixels in the adjacent frame;
averaging at least the multiple first adjacent supporting patch pixels in the adjacent frame and the multiple second adjacent supporting patch pixels in the adjacent frame to obtain an average value; and
replacing the first pixel in the first frame with the average value.

8. The computer-readable memory device or storage device of claim 7, wherein the averaging comprises:
weighting the multiple first adjacent supporting patch pixels and the multiple second supporting patch pixels by spatial distance from the adjacent local patch.

9. The computer-readable memory device or storage device of claim 7, wherein the averaging comprises:
calculating the average value using a combined set of supporting patches that includes the set of adjacent supporting patches and other sets of other supporting patches from other frames of the video sequence including at least one frame of the video sequence that is not directly adjacent to the first frame, wherein the calculating comprises weighting individual patches of the combined set based on temporal distance from the first frame.

10. The computer-readable memory device or storage device of claim 7, the acts further comprising:
estimating at least one noise value for the adjacent frame in the video sequence; and
adjusting the average value based, at least in part, on the estimated at least one noise value.

11. The computer-readable memory device or storage device of claim 10, the acts further comprising:
matching the first local patch to another first patch that is also in the first frame of the video sequence, the another first patch comprising multiple other first patch pixels; and
averaging the multiple other first patch pixels in the first frame with at least the multiple first adjacent supporting patch pixels in the adjacent frame and the multiple second adjacent supporting patch pixels in the adjacent frame to obtain the average value.

12. The computer-readable memory device or storage device of claim 11, the acts further comprising:
selecting a combined set of patches, wherein selecting the combined set of patches comprises:
sampling the first frame to select an initial set of initial patches;
storing the initial set in a priority data structure that orders the initial patches in the initial set based on content similarities of the initial patches with the first local patch; and
refining the initial set using an iterative process,
wherein the averaging is performed on the combined set.

13. The computer-readable memory device or storage device of claim 12, wherein the iterative process comprises:
replacing, in the priority data structure, an individual initial patch in the initial set with a neighboring patch having relatively greater content similarity to the first local patch.

14. A system, comprising:
at least one processing device; and
at least one volatile or non-volatile memory storing computer-readable instructions that cause the at least one processing device to:
select a first pixel in a first frame of a video sequence;
project a location of the first pixel into an adjacent frame of the video sequence using a motion estimation algorithm to obtain a projected pixel location;
select an adjacent local patch from the adjacent frame using the projected pixel location;
select at least two adjacent supporting patches from the adjacent frame and add the at least two adjacent supporting patches from the adjacent frame to a combined set of patches; and
determine a value for the first pixel by averaging the combined set of patches that includes the at least two adjacent supporting patches from the adjacent frame.

15. The system of claim 14, wherein:
the adjacent frame occurs in the video sequence after the first frame, and
the computer-readable instructions that cause the at least one processing device to:
  project the location of the first pixel into another adjacent frame that occurs in the video sequence prior to the first frame to obtain another projected pixel location;
  select another adjacent local patch from the another adjacent frame using the another projected pixel location;
  select at least two other adjacent supporting patches from the another adjacent frame and add the at least two other adjacent supporting patches from the adjacent frame to the combined set of patches; and
  determine the value for the first pixel by averaging the combined set of patches that includes the at least two adjacent supporting patches from the adjacent frame and the at least two other adjacent supporting patches from the another adjacent frame.

16. The system of claim 15, wherein the average value is a weighted average value based on at least one of temporal or spatial distance from the first pixel to individual patches in the combined set.

17. The system of claim 15, wherein the computer-readable instructions further cause the at least one processing device to:
  select the at least two adjacent supporting patches from the adjacent frame based on content similarity of the at least two adjacent supporting patches to the adjacent local patch.

18. The system of claim 14, wherein the computer-readable instructions further cause the at least one processing device to:
  select first supporting patches from the first frame based on content similarity of the first supporting patches to a first local patch that contains the first pixel; and
  add the first supporting patches to the combined set of patches and determine the average value by averaging the first supporting patches from the first frame and the at least two adjacent supporting patches from the adjacent frame.

19. The system of claim 14, wherein the computer-readable instructions further cause the at least one processing device to:
  project the location of the first pixel into another frame of the video sequence that is not directly adjacent to the first frame using the motion estimation algorithm to obtain another projected pixel location;
  select another local patch from the another frame using the another projected pixel location;
  select at least two other supporting patches from the another frame and add the at least two other supporting patches to the combined set of patches; and
  determine the average value by averaging the at least two adjacent supporting patches from the adjacent frame and the at least two other supporting patches from the another frame that is not directly adjacent to the first frame.

20. The system of claim 14, wherein the computer-readable instructions that cause the at least one processing device to:
  replace the first pixel in the first frame with the value.

* * * * *